US012052957B2

(12) United States Patent
Lan et al.

(10) Patent No.: US 12,052,957 B2
(45) Date of Patent: Aug. 6, 2024

(54) PLANT GROW LIGHTING SYSTEM

(71) Applicant: Shenzhen Guanke Technologies Co., Ltd, Shenzhen (CN)

(72) Inventors: Qing Lan, Shenzhen (CN); Shoubao Chen, Shenzhen (CN); Minggui Wang, Shenzhen (CN); Ligen Liu, Shenzhen (CN); Qilong Cai, Shenzhen (CN); Rong Xie, Shenzhen (CN)

(73) Assignee: Shenzhen Guanke Technologies Co., Ltd, Shenzhen (CN)

( * ) Notice: Subject to any disclaimer, the term of this patent is extended or adjusted under 35 U.S.C. 154(b) by 23 days.

(21) Appl. No.: 17/940,336

(22) Filed: Sep. 8, 2022

(65) Prior Publication Data

US 2024/0008424 A1 Jan. 11, 2024

(30) Foreign Application Priority Data

Jul. 11, 2022 (CN) .......................... 202221876864.6

(51) Int. Cl.
*A01G 9/24* (2006.01)
*A01G 9/02* (2018.01)
*A01G 31/06* (2006.01)
(52) U.S. Cl.
CPC ............. *A01G 9/249* (2019.05); *A01G 9/023* (2013.01)
(58) Field of Classification Search
CPC ........ A01G 9/249; A01G 9/246; A01G 9/022; A01G 9/023; A01G 31/06
See application file for complete search history.

(56) References Cited

U.S. PATENT DOCUMENTS

| | | | | |
|---|---|---|---|---|
| 10,667,469 B2* | 6/2020 | Van Gemert | .......... | A01G 9/249 |
| 10,842,082 B1* | 11/2020 | Genga, Jr. | .............. | A01G 9/249 |
| 10,941,927 B1* | 3/2021 | Yang | .......................... | F21S 4/28 |
| 11,246,267 B2* | 2/2022 | Goettle | .................. | A01G 7/045 |
| 11,297,779 B1* | 4/2022 | Lund | ........................ | A01G 9/18 |
| 11,582,920 B2* | 2/2023 | Romine | ................. | A01G 9/246 |
| 11,598,516 B1* | 3/2023 | Yang | ...................... | F21V 23/003 |
| 11,635,181 B2* | 4/2023 | Burkhart | ................. | F21V 21/03 362/217.16 |
| 2009/0301979 A1* | 12/2009 | Tanaka | ................. | G02B 6/0011 211/49.1 |

(Continued)

*Primary Examiner* — Monica L Perry
(74) *Attorney, Agent, or Firm* — Maier & Maier, PLLC

(57) ABSTRACT

A plant grow lighting system for stimulating plant growth. The plant grow lighting system includes a growth rack, at least one main plant-lighting lamp and at least one auxiliary plant-lighting lamp. Defining height direction of the growth rack as up-down direction, length direction as front-rear direction, and width direction as left-right direction, where the growth rack includes one or more rack layers; the main plant-lighting lamp is provided on the growth rack, the main plant-lighting lamp includes at least one first light-emitting module to emit light downwards; the auxiliary plant-lighting lamp is provided on the growth rack and includes two second light-emitting modules, the second light-emitting module can emit light in a horizontal direction, and the power of the auxiliary plant-lighting lamp is less than the power of the main plant-lighting lamp. The technical solution of the present disclosure makes it possible to provide uniform illumination conditions for plants.

14 Claims, 17 Drawing Sheets

(56) References Cited

U.S. PATENT DOCUMENTS

| | | | |
|---|---|---|---|
| 2013/0255146 A1* | 10/2013 | Lehman | A01G 31/02 47/17 |
| 2016/0235014 A1* | 8/2016 | Donham | A01G 7/045 |
| 2016/0324090 A1* | 11/2016 | Miyabe | A01G 31/06 |
| 2017/0354099 A1* | 12/2017 | Haughton | A01G 9/249 |
| 2019/0059241 A1* | 2/2019 | Bogner | A01G 9/249 |
| 2020/0000043 A1* | 1/2020 | Bennett | A01G 9/249 |
| 2021/0059140 A1* | 3/2021 | McHenry, III | C02F 1/441 |
| 2021/0274721 A1* | 9/2021 | Tsao | F21V 21/24 |

\* cited by examiner

PLANT GROW LIGHTING SYSTEM

TECHNICAL FIELD

The present disclosure generally relates to the technical field of lamps, and particularly relates to a plant light supplement lamp and a plant grow lighting system.

BACKGROUND

The indoor artificial cultivation generally uses plant illumination system composed of plant-lighting lamps and three-dimensional growth racks to improve the illumination intensity and the indoor space utilization efficiency. In the related art plant grow lighting system, the light emission angle of plant-lighting lamps are single, and generally only one type of plant-lighting lamp provides illumination; for plants with high growth height and dense planting sites, this single type of plant light scheme is difficult to provide uniform light conditions for plants, resulting in abundant light in the upper part and insufficient light in the lower part of plants with dense leaves, thus affecting the growth efficiency of plants.

The foregoing is provided merely to aid in the understanding of the technical solution of the present application and is not an admission that the foregoing is prior art.

SUMMARY

The main object of the present disclosure is to provide a plant grow lighting system intended to provide uniform lighting conditions for plants. In addition, there is provided a type of plant light supplement lamp, so that the plant light supplement lamp can compensate for light distribution defect of general plant-lighting lamp, and has high heat radiation performance and an improved service life.

In order to achieve the above-mentioned object, the plant grow lighting system proposed by the present disclosure comprises:

a growth rack, defining height direction of the growth rack as up-down direction, length direction as front-rear direction, and width direction as left-right direction, wherein the growth rack comprises one or more rack layers;

at least one main plant-lighting lamp, wherein the main plant-lighting lamp is provided on the growth rack, and the main plant-lighting lamp comprises at least one first light-emitting module, and the first light-emitting module can emit light downwards; and at least one auxiliary plant-lighting lamp, wherein auxiliary plant-lighting lamp is provided on the growth rack, the auxiliary plant-lighting lamp comprises at least one second light-emitting module, the second light-emitting module can emit light in a horizontal direction, and the power of the auxiliary plant-lighting lamp being less than the power of the main plant-lighting lamp.

Other features and corresponding advantages of the present application are set forth in a later portion of the specification.

The technical problem solving idea and the relevant product design scheme of the present application are:

Main plant-lighting lamp and auxiliary plant-lighting lamp are provided on the growth rack, wherein the main plant-lighting lamp emit light downwards, are the main light source for plant growth, and provide most of the light energy for plant growth; the auxiliary plant-lighting lamp emit light to both sides, the power of the auxiliary plant-lighting lamp is less than that of the main plant-lighting lamp, and is used as the auxiliary light source; when the light emitted downwards by the main plant-lighting lamp is blocked (such as being blocked by the stem, leaf or other things of a plant), the auxiliary plant-lighting lamp can further supplement light, so that more leaves of the plant can sufficiently obtain light. The main plant-lighting lamp and the auxiliary plant-lighting lamp are used in combination to obtain a more uniform and abundant light environment when plants are densely planted or the plant height is high. That is, the main plant-lighting lamp and the auxiliary plant-lighting lamp are provided at the same time on the growth rack, more growth racks can be provided in the indoor space, and more, more dense plants can be cultivated on the growth racks, thereby greatly improving the space utilization efficiency of indoor cultivation. When the plant height is low, only the main plant-lighting lamp can be used. When the plant height is high and the leaves are dense, so that the main plant-lighting lamp are difficult to irradiate the lower leaves of the plant, the auxiliary plant-lighting lamp can be turned on as auxiliary light source, and the installation height of the auxiliary plant-lighting lamp can be lower than that of the main plant-lighting lamp, and the auxiliary plant-lighting lamp irradiates the lower leaves of the plant. In addition, the installation position of the main plant-lighting lamp can be adjusted to be very close to the plant, and the power of the main plant-lighting lamp can be set as required, thereby saving energy consumption of the lamps.

The growth rack may have a square structure, comprising four vertical posts, a plurality of transverse posts and a plurality of longitudinal posts, wherein the vertical posts extend in the up-down direction, the transverse posts extend in the left-right direction, and the longitudinal posts extend in the front-rear direction, and the specific structure is as shown in FIG. 3. Wherein a plurality of transverse columns of the same height and a plurality of longitudinal columns of the same height constitute one rack layer, and the growth rack may comprise a plurality of rack layers to improve space utilization efficiency. According to different plant cultivars, corresponding trays for plant cultivation may be provided on the rack layer. The growth rack adopts a quick assembly structure, so that the vertical columns and transverse columns can be quickly assembled and disassembled, so as to facilitate the installation and transportation of the growth rack.

Further, at least one lift&fall mechanism is provided on the growth rack for adjusting the height of the main plant-lighting lamp, so that the main plant-lighting lamp can be adapted to the illumination requirements of the same plant at different growth stages, so that the optimal illumination adjustment is maintained for the plant. Of course, it can also be adapted to the light requirements of different plants. The lift&fall mechanism may be driven by motor-lead screw, pulley structure, or other structure. At least one fixing rod is further provided on the grow rack, the auxiliary plant-lighting lamp is detachably mounted on the fixing rod, the fixing rod has a plurality of first mounting positions with different heights, and the auxiliary plant-lighting lamp can be mounted on different first mounting positions so as to adjust the height of the auxiliary plant-lighting lamp. In addition, the fixing rod can also be detachably mounted on the transverse columns of the growth rack, a plurality of second mounting positions in the left-right direction are provided on the transverse columns, and the fixing rod can be mounted at different second mounting positions, so that the auxiliary plant-lighting lamp can be flexibly adjusted in the left-right direction along with the fixing rod. A moving mechanism is further provided at the bottom of the growth rack, and the bottom of the moving mechanism is provided with at least one guide guide rail and at least one guide wheel, wherein the guide rail is used for fixing on the ground, and the guide rail extends in the left-right direction and define that the at least one guide wheel moves in the left-right direction. Limiting the moving mechanism to move only in the left-right direction, so as to improve the smooth movement of the growth rack, and avoiding the cultivated plants from shaking or falling during the movement; Further, it is possible to eliminate the need for aisles between adjacent growth racks, thereby saving the indoor space area and increasing the number of rack layers, setting the height of the growth rack to 3 meters or more, and greatly increasing the indoor planting density. The plant grow lighting system is further provided with a fan assembly, a air pipe assembly, a carbon dioxide device and a control assembly, wherein the carbon dioxide device outputs carbon dioxide, the fan assembly mixes air with the carbon dioxide output by the carbon dioxide device, and then delivers the mixed air to the plant through the air pipe assembly, so as to uniformly provide abundant carbon dioxide to the plant, thereby improving the photosynthetic efficiency of the plant and promoting plant growth. The control assembly is provided with a plurality of control keys for controlling and adjusting the rise and fall of the main plant-lighting lamp, the brightness of the main plant-lighting lamp, the brightness of the auxiliary plant-lighting lamp and the wind speed of the fan assembly, so that the plant grow lighting system can be applicable to plants at different heights, different planting densities and different cultivation stages.

Further, the auxiliary plant-lighting lamp is arranged in a hollow long strip shape, the air pipe assembly is connected to the heat dissipation inner cavity of the auxiliary plant-lighting lamp, and a plurality of air outlet holes are arranged at intervals on the surface of the heat sink of the auxiliary plant-lighting lamp, so that the carbon dioxide can be uniformly delivered to each cultivated plant through the heat sink of the auxiliary plant-lighting lamp, and at the same time, the heat dissipation performance of the auxiliary plant-lighting lamp can be improved, and additional carbon dioxide delivery pipeline can be avoided, which is beneficial to simplifying the structure. Therefore, the auxiliary plant-lighting lamp has ventilation function in addition to the light supplement function, and the ventilation function can be used alone, or the light supplement function and the ventilation function can be used simultaneously. For plants pursuing flower yield such as hemp, the light supplement function of the auxiliary plant-lighting lamp can be reduced at other growth stages of the plant since the light supplement contribution of the auxiliary plant-lighting lamp at the flowering stage is obvious. At this time, the auxiliary plant-lighting lamp may be set to a lower position (lower than the main plant-lighting lamps) of the plant to better perform a ventilating function of the auxiliary plant-lighting lamp. In addition, the ventilation system composed of the auxiliary plant-lighting lamp and the fan assembly can also improve the climate consistency of indoor space.

In addition, the present disclosure also relates to a plant light supplement lamp, namely, the above-mentioned auxiliary plant-lighting lamp, comprising a heat sink, at least one second light-emitting module and two end covers. The heat sink extends in the front-rear direction and is provided in an elongated shape, and has a hollow tubular structure penetrating both front and rear ends thereof; the second light-emitting modules are provided on the left side and/or the right side of the heat sink; two end covers are respectively provided at openings of the front and rear ends of the heat sink, one of the two end covers is provided with a hollow connecting pipe, the connecting pipe is used for communicating external air transmission pipe with an internal cavity of the heat sink, and the heat sink is further provided with air outlet holes communicating with the internal cavity thereof.

BRIEF DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

Figure 1:
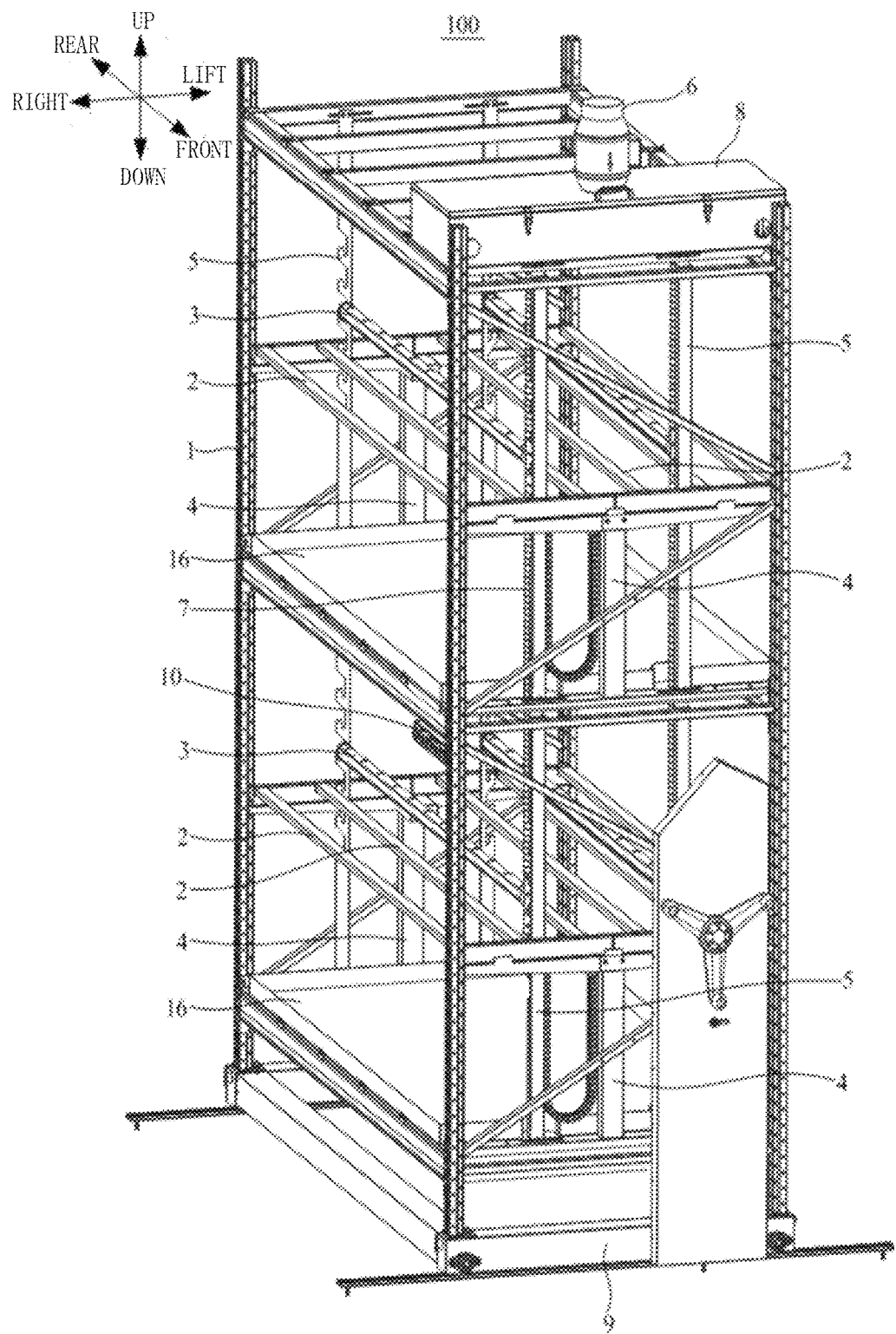
FIG. 1 illustrates a schematic structural diagram of an embodiment of the plant grow lighting system of the present disclosure.

The shape, size, proportion or positional relationship of the component parts of the product shown in the drawings can be actual data of the example embodiments and fall within the scope of protection of the present application.

DETAILED DESCRIPTION

In order that the objects, aspects and advantages of the present application will become more apparent, a more particular description of embodiments of the present application will be rendered by reference to the appended drawings. It should be understood that the particular embodiments described herein are illustrative only and are not restrictive.

Figure 2:
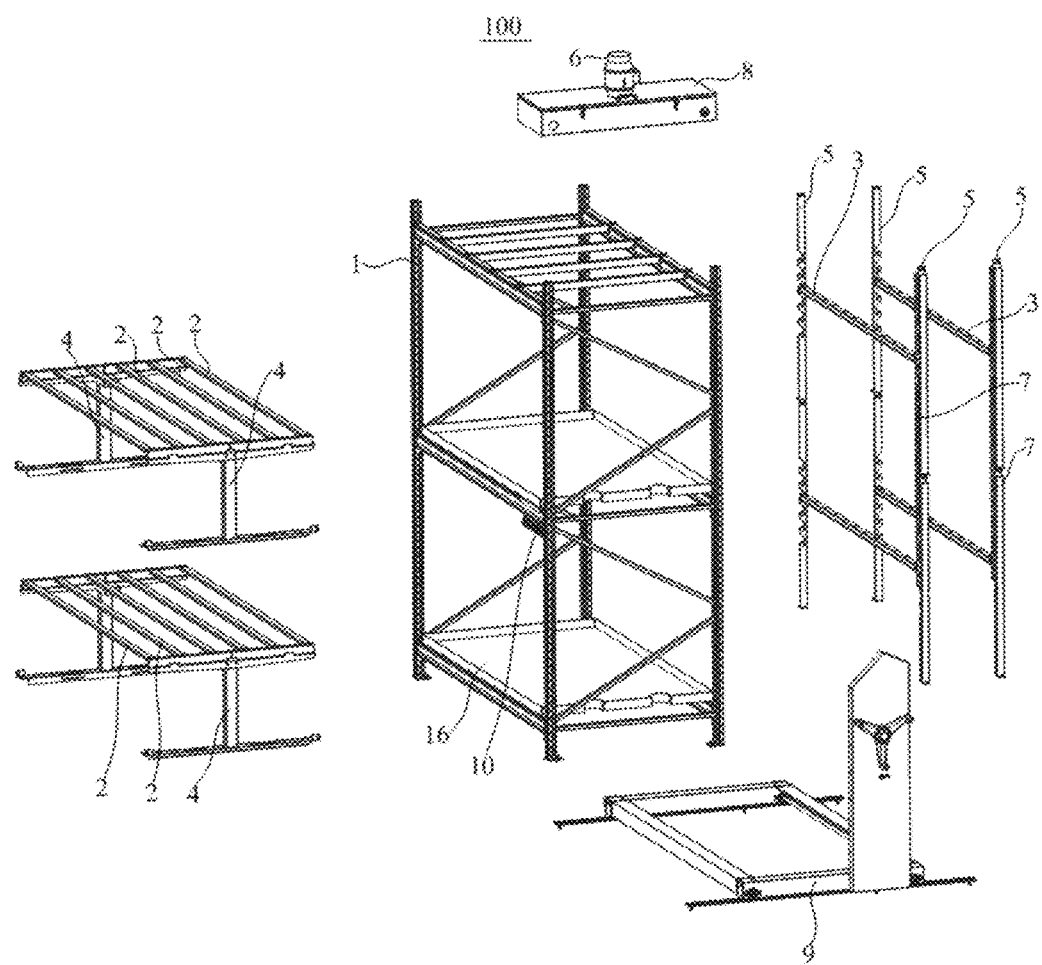
FIG. 2 illustrates a schematic view of an exploded configuration of the plant grow lighting system of FIG. 1.

With reference to FIG. 1 and FIG. 2, the present disclosure proposes a plant grow lighting system 100. In one embodiment of the present disclosure, the plant grow lighting system 100 comprises a growth rack 1, at least one main plant-lighting lamp 2 and at least one auxiliary plant-lighting lamp 3. Defining height direction of the growth rack 1 as up-down direction, length direction as front-rear direction, and width direction as left-right direction, wherein the growth rack 1 comprises one or more rack layers 11 arranged successively in the up-down direction, the main plant-lighting lamp 2 are arranged on the growth rack 1, the main plant-lighting lamp 2 comprises at least one first light-emitting module 21, and the first light-emitting module 21 can emit light downwards; The auxiliary plant-lighting lamp 3 is provided on the growth rack 1, the auxiliary plant-lighting lamp 3 comprises at least one second light-emitting module 31, the second light-emitting module 31 can emit light in horizontal direction, and the power of the auxiliary plant-lighting lamp 3 is less than the power of the main plant-lighting lamp 2, for example, the power ratio of the main plant-lighting lamp 2 and the auxiliary plant-lighting lamp 3 can range from 2:1 to 12:1.

Figure 3:
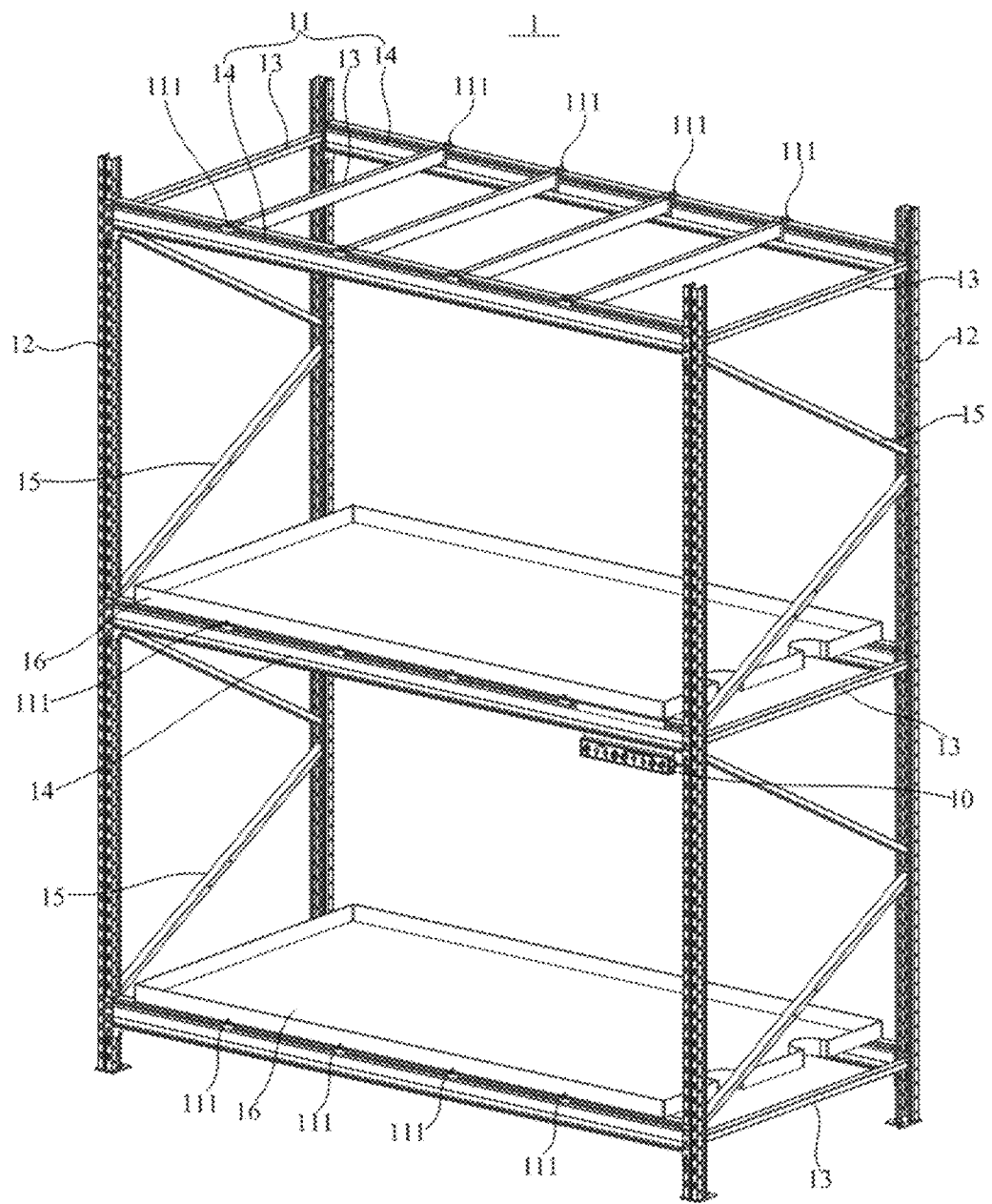
FIG. 3 illustrates a schematic view of the growth cage of FIG. 2.

The growth rack 1 can be used as the main body structure of the plant grow lighting system 100 to mount and carry mechanisms such as the main plant-lighting lamps 2 and the auxiliary plant-lighting lamps 3. The plant grow lighting system 100 may comprise a plurality of growth racks 1, wherein the plurality of growth racks 1 are of an integral structure, and each growth rack 1 is provided with the main plant-lighting lamps 2 and the auxiliary plant-lighting lamps 3. In addition, the grow rack 1 may have a square structure, so that the shape thereof is regular and convenient for processing and shaping; at the same time, the splicing or arrangement between a plurality of growth racks 1 can be facilitated to improve the utilization efficiency of the indoor space. Specifically, referring to FIG. 3, the growth rack 1 may comprise four vertical columns 12, a plurality of transverse columns 13 and a plurality of longitudinal columns 14, wherein the vertical columns 12 extend in the up-down direction, the transverse columns 13 extend in the left-right direction, and the longitudinal columns 14 extend in a front-rear direction, and the plurality of transverse columns 13 and the plurality of longitudinal columns 14 located at the same height constitute one rack layer 11. At this time, the grow rack 1 is enclosed and formed by a plurality of columns, so that it is possible to reduce raw materials required for manufacturing the grow rack 1, thereby contributing to reduction of manufacturing costs. In order to improve the overall strength of the grow rack 1, the grow rack 1 may further comprise a plurality of strengthening columns 15, wherein the strengthening columns 15 are located between each adjacent two frame layers 11, and two ends of the strengthening columns 15 are respectively connected to two vertical columns 12 sequentially distributed in the left-right direction.

Figure 4:
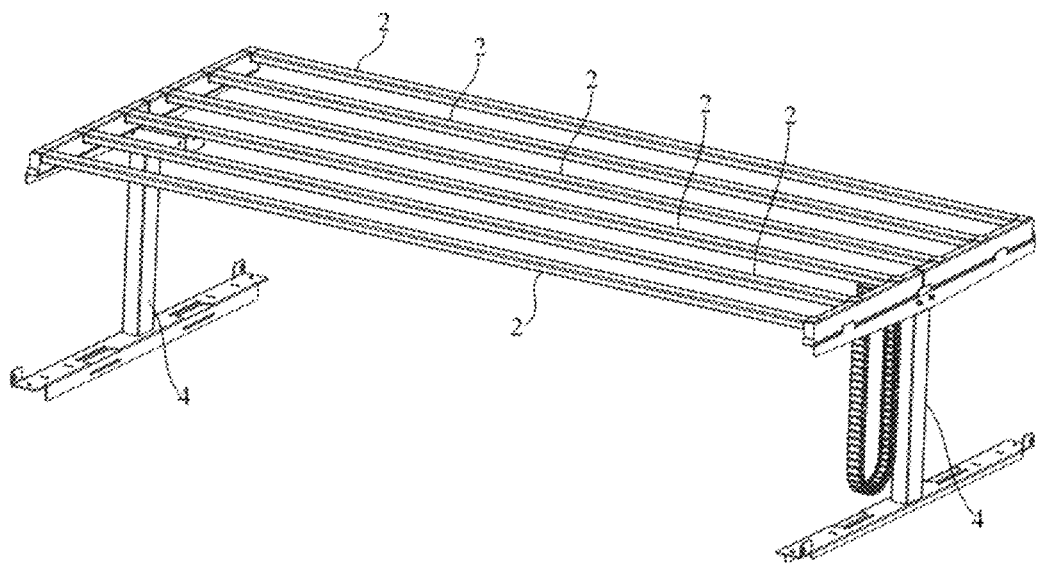
FIG. 4 illustrates a perspective view of an assembled structure of the main plant-lighting lamp and the elevating mechanism of FIG. 2.

Further, in order to provide a better light condition to the plants on the respective rack layers 11, the plant grow lighting system 100 is provided with the main plant-lighting lamps 2 and the auxiliary plant-lighting lamps 3 on each rack layer 11, and the installation height of the auxiliary plant-lighting lamps 3 on the same rack layer 11 may be lower than the installation height of the main plant-lighting lamps 2 so as to irradiate lower leaves of the plants. Of course, in other embodiments, the height of the auxiliary plant-lighting lamps 3 may be higher than the height of the main plant-lighting lamps 2. Further, of the plurality of main plant-lighting lamps 2 at the same height, the plurality of the main plant-lighting lamps located on the left side may be provided in an integrated structure, and the plurality of the main plant-lighting lamps located on the right side may be provided in an integrated structure. In this way, a plurality of the main plant-lighting lamps 2 at the same height can be split into two lamp groups in half, the installation and circuit wiring of the main plant-lighting lamps 2 can be simplified, and the transportation can be facilitated. For example: the number of main plant-lighting lamps 2 at the same height illustrated in FIG. 4 is six, in which case the three main plant-lighting lamps on the left side may be integrated into one lamp group and the three main plant-lighting lamps on the right side may be integrated into one lamp group. Further, in order to facilitate the placement of plants on the respective rack layers 11 of the growth rack 1, the plant grow lighting system 100 further comprises at least one tray 16, which is mounted on the respective rack layer 11 so as to provide a placement position for plants by means of the tray 16. At this time, each rack layer 11 is provided with a plurality of position-limit plates 111 extending upward on both left-right ends, and the position-limit plates 111 can abut against the side wall surface of the tray 16 so that the tray 16 are limitedly mounted on the rack layer 11. Thus, the tray 16 is restrained directly by the position-limit plates 111, so that the installation and removal of the tray 16 on the shelf can be facilitated.

Figure 5:
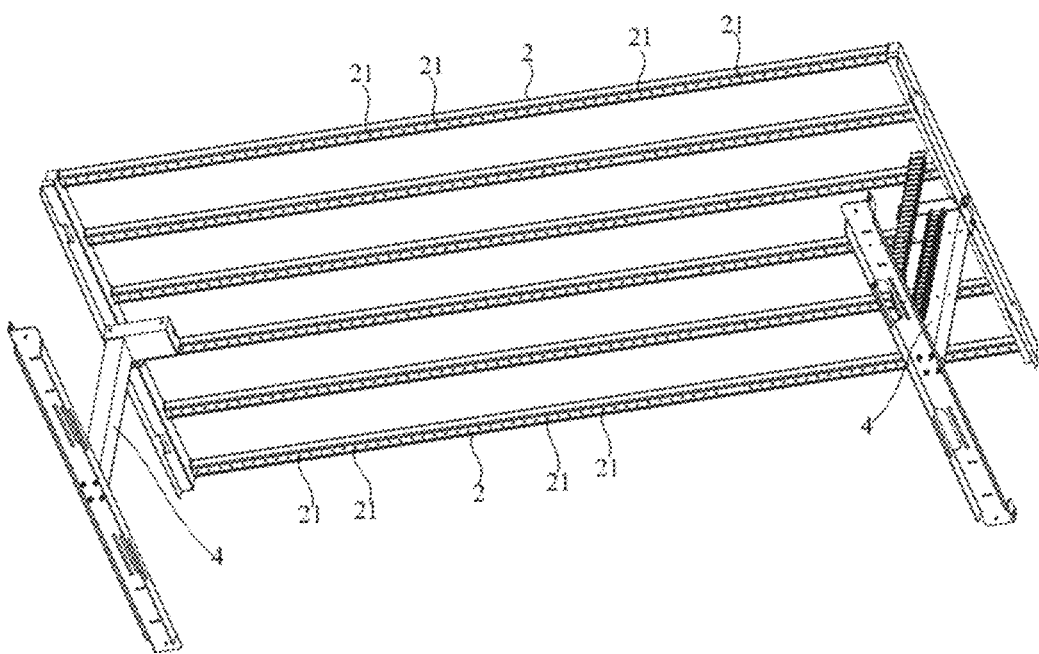
FIG. 5 illustrates another perspective view of the assembled structure of the main plant-lighting lamp and the lift&fall mechanism of FIG. 2.

In an embodiment of the present disclosure, referring to FIG. 4 and FIG. 5 in combination, in order to enable the main plant-lighting lamps 2 to rise as the plant seedlings grow tall, optimal lighting conditions are maintained for the plant, the plant grow lighting system 100 may further comprise lift&fall mechanisms 4, wherein the lift&fall mechanisms 4 are fixed to the growth rack 1, the main plant-lighting lamps 2 are mounted on the lift&fall mechanisms 4, and the lift&fall mechanisms 4 are used for driving the main plant-lighting lamps 2 to move in the up-down direction. Wherein the lift&fall mechanism 4 comprises a motor and a lead screw, and when the lead screw is driven to rotate by the motor, the lead screw drives the main plant-lighting lamps 2 to lift or fall. Of course, a pulley structure drive or other structure drive is also possible in other embodiments. In order to improve the stability of the driving of the main plant-lighting lamps 2, a plurality of main plant-lighting lamps 2 of the same height are provided with a lift&fall mechanism 4 at both ends of the main plant-lighting lamps 2 in the extending direction thereof.

Figure 9:
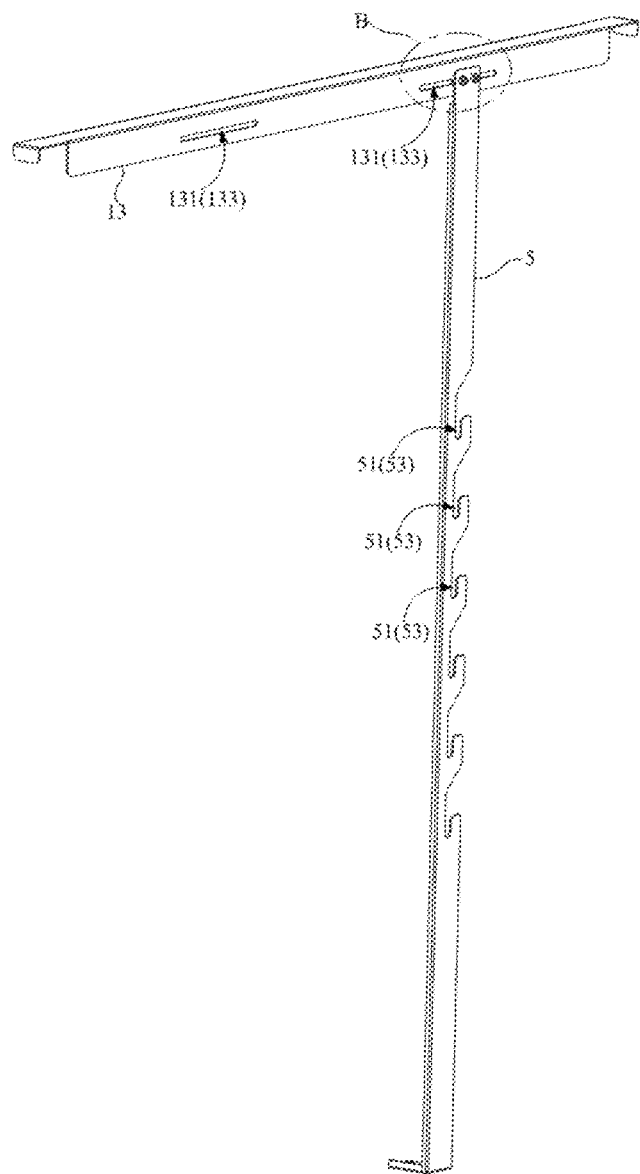
FIG. 9 illustrates a schematic view showing an assembled structure of the fixing rod and the grow rack of FIG. 1.
Figure 10:
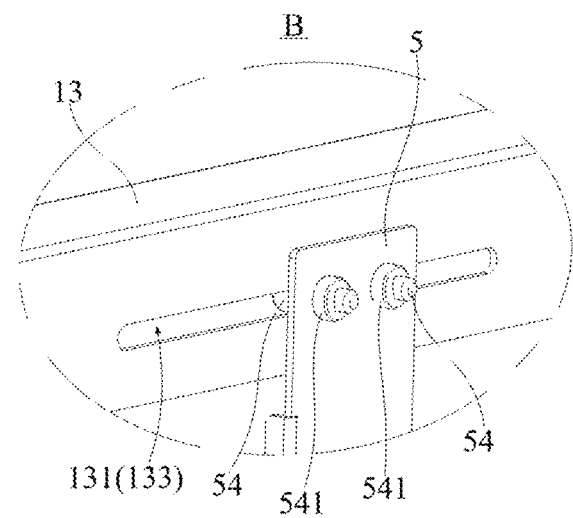
FIG. 10 illustrates a partially enlarged schematic view at B in FIG. 9.

Further, in order to enable the height of the auxiliary plant-lighting lamps 3 to be adjusted, referring to FIGS. 2, 6, 7 and 8 in combination, the plant grow lighting system 100 may further comprise at least one fixing rod 5, wherein the fixing rod 5 is provided on the growth rack 1 and extends in the up-down direction, the fixing rod 5 is further provided with a plurality of first mounting positions 51 in the up-down direction, and the auxiliary plant-lighting lamp 3 may be mounted on any one of the first mounting positions 51. Wherein a plurality of clamping grooves 53 are provided on the fixing rod 5, the clamping grooves 53 are formed as the first mounting positions 51, a clamping column 330 are provided at the end of the auxiliary plant-lighting lamp 3, and the clamping column 330 can be mounted in the clamping groove 53 via the notch of the clamping groove 53 so as to limit the auxiliary plant-lighting lamp 3 to be mounted on the first mounting position 51. At this time, by limiting the installation of the auxiliary plant-lighting lamp 3 through the clamping groove 53, the connection structure of the auxiliary plant-lighting lamp 3 and the fixing rod 5 is very simple, and the convenience of installation and removal of the fixing rod 5 can be improved. The notch of the clamping groove 53 may face upward, so that the auxiliary plant-lighting lamp 3 is installed and removed in the up-down direction without easily colliding with the structure such as the main plant-lighting lamp 2. Further, in order to allow the position of the auxiliary plant-lighting lamp 3 to be adjusted in the left-right direction, referring to FIGS. 9 and 10 in combination, the fixing rod 5 is detachably connected to the grow rack 1, the grow rack 1 is provided with a plurality of second mounting positions 131 extending in the left-right direction, and the fixing rod 5 can be mounted at different positions in the extending direction of the second mounting position 131. Specifically, the transverse columns 13 of the growth rack 1 are provided with elongated holes 133 along the extension direction thereof, the elongated hole 133 is formed as the second mounting position 131, at least one stud 54 passing through the fixing rod 5 passes through the elongated hole 133, and the stud 54 passing through the elongated hole 133 is sheathed with a nut 541 so that the fixing rod 5 are detachably mounted to the second mounting position 131. At this time, the assembly and disassembly process of the fixing rod 5 can be simplified by the cooperation of the stud 54 and the nut 541 while ensuring the stability of the fixing rod 5 installed on the growth rack 1.

In an embodiment of the present disclosure, the plant grow lighting system 100 can be used for planting hemp, and the growth cycle of the hemp comprises: seed growing period (the seeds of a plant grow seedlings or clones, at the seedling stage)-vegetative period (the stem and leaf growth of a plant, also called leaf stage)-flowering period (the flowering to flower maturity stage of a plant), wherein the vegetative period and the flowering period can be cultivated on the plant growth rack 1. The results showed that the suitable spectral parameters for hemp planting were: the main plant-lighting lamps 2 emit visible light with a wavelength of 380 nm-780 nm when working, the visible light contains red light with a wavelength of 600-700 nm, and the proportion of the radiant energy of the red light to the radiant energy of the visible light is greater than 40%; the spectrum of the auxiliary plant-lighting lamps 3 can be the same as the spectrum of the main plant-lighting lamp 2, and the proportion of red light can also be increased (namely, even if the proportion of red light emitted by the auxiliary plant-lighting lamps 3 is greater than the proportion of red light emitted by the main plant-lighting lamps 2), so that the plant can absorb more nutrients during the flowering period; in addition, it has been shown that adjusting the main plant-lighting lamps 2 and/or the plant-lighting lamps at the vegetative period and flowering period of hemp so that the photosynthetic photon flux density (PPFD) at the top of the plant is 800-1200 umol/s can be most beneficial to the growth of hemp.

In an embodiment of the present disclosure, in order to enable the auxiliary plant-lighting lamps 3 to further have ventilation function on the basis of having light supplement, referring to FIGS. 11 to 16 in combination, each auxiliary plant-lighting lamp 3 may comprise a heat sink 32, at least one second lighting module 31 and two end caps 33. The heat sink 32 is provided in an elongated shape extending in the front-rear direction, and has a hollow tubular structure penetrating the front and rear ends thereof; the second light-emitting modules 31 are provided on the left side and/or the right side of the heat sink 32 (wherein the second light-emitting modules 31 can be provided on the left side and the right side of the auxiliary plant-lighting lamp 3, and the light-emitting directions of the two second light-emitting modules 31 are arranged opposite to each other), and the second light-emitting module 31 can emit light in a horizontal direction; the two end covers 33 are respectively provided at the openings of the front and rear ends of the heat sink 32, one of the two end covers 33 is provided with a hollow connecting pipe 338, the connecting pipe 338 is used for communicating the external air transmission pipe 71 with the internal cavity of the heat sink 32, and the heat sink 32 is further provided with a plurality of air outlet holes 321 communicating with the internal cavity thereof.

In the present embodiment, mixed gas of indoor air and carbon dioxide can be inputted through the connecting pipe 338 of the heat sink 32, and then transmitted to the plants through the air outlet holes 321, so that the plants can grow better. At this time, the air transmission pipe 71, the connecting pipe 338, and the heat sink 32 may constitute an air pipe assembly 7 through which the air containing a high concentration of carbon dioxide is discharged, that is, the concentration of carbon dioxide in the air ranges from 1200 to 1400 mg/L. Further, the air may be passed through strainers before being discharged from the air pipe assembly 7, through which strainers the air is filtered to a level not lower than the MERV8 level to ensure that clean air is discharged to the plants. Of course, it is also possible that the plant grow lighting system 100 further comprises at least one ultraviolet module, and the air is sterilized by the ultraviolet module before being discharged from the air pipe assembly 7. In addition, it should be noted that, in other embodiments, the plant grow lighting system 100 may further include a fan assembly 6 and a carbon dioxide device, by which carbon dioxide may be generated, the fan assembly 6 may mix indoor air with the carbon dioxide, and then deliver the mixed air to the through the air pipe assembly 7. Alternatively, the air pipe assembly 7 includes only the air transmission pipes 71 through which the mixed air and carbon dioxide is directly discharged toward the plants. Here, the air transmission pipe 71 may be flexible pipes of telescopic length so that deformation may occur to improve the convenience of installation.

Figure 11:
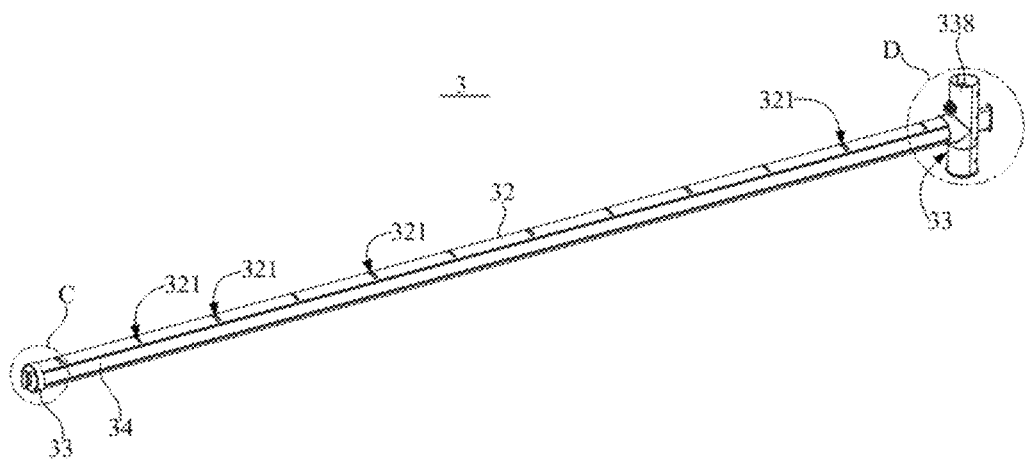
FIG. 11 illustrates a schematic view showing the structure of the auxiliary plant-lighting lamp of FIG. 6.
Figure 12:
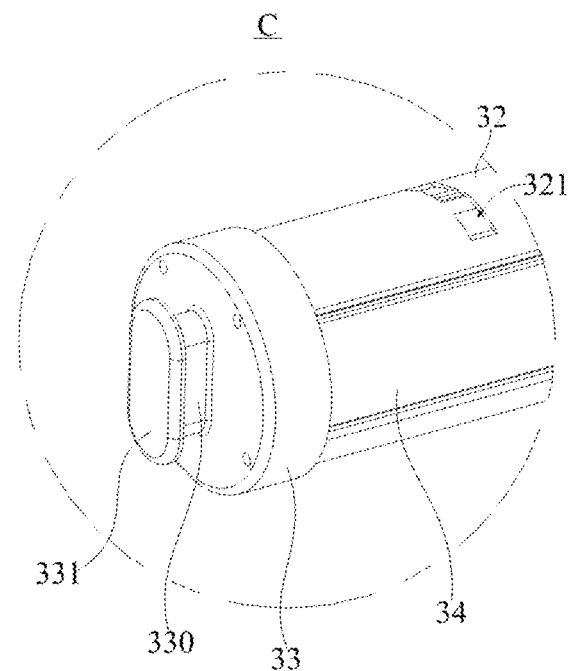
FIG. 12 illustrates a partially enlarged schematic view at C in FIG. 11.

Further, referring to FIGS. 11 and 12 in combination, the air outlet holes 321 may be provided at the top of the heat sink 32. Since the front side of the plant leaves is generally upward, and the back side of the leaves at the bottom is used for absorbing carbon dioxide, arranging the air outlet holes 321 at the top can blow carbon dioxide upward toward the back side of the leaves, thereby promoting the absorption of carbon dioxide by the leaves and improving the efficiency of photosynthesis of the plant. Meanwhile, since the density of the carbon dioxide is greater than that of the air, the upward arrangement of the air outlet holes 321 allows the carbon dioxide to be more uniformly dispersed in the space. In addition, by blowing air to the leaves, it is possible to dry the leaves and suppress the multiplication of pathogens, thereby reducing the occurrence of diseases such as powdery mildew. The air outlet hole 321 may be provided in an elongated shape to ensure that the air outlet hole 321 has a large air outlet efficiency. The number of the air outlet holes 321 may be plural, and the plural air outlet holes 321 are spaced apart in the front-rear direction on the heat sink 32. The surface of the top of the heat sink 32 is provided as a non-planar surface, and specifically can be an arc surface or other shape, so that the air outlet holes 321 can be formed by one-time sawing or milling to improve the machining efficiency of parts.

Further, the end cap 33 may be removably attached to the heat sink 32 to improve ease of removal and maintenance thereof. Specifically, the end cap 33 may be attached by screws or clamping columns. In addition, referring to FIGS. 11 to 13 in combination, the clamping column 330 is provided at the end of the end cover 33 facing away from the heat sink 32, and in order to prevent the clamping column 330 from escaping from the clamping groove 53 in the front-rear direction, the clamping column 330 is provided with a stop plate 331 at the end facing away from the end cover 33, and at least part of the projection of the stop plate 331 on the end cover 33 is located outside the projection of the clamping column 330 on the end cover 33, so that the stop plate 331 and the end cover 33 can be limited in the front-rear direction by the cooperation thereof.

Figure 6:
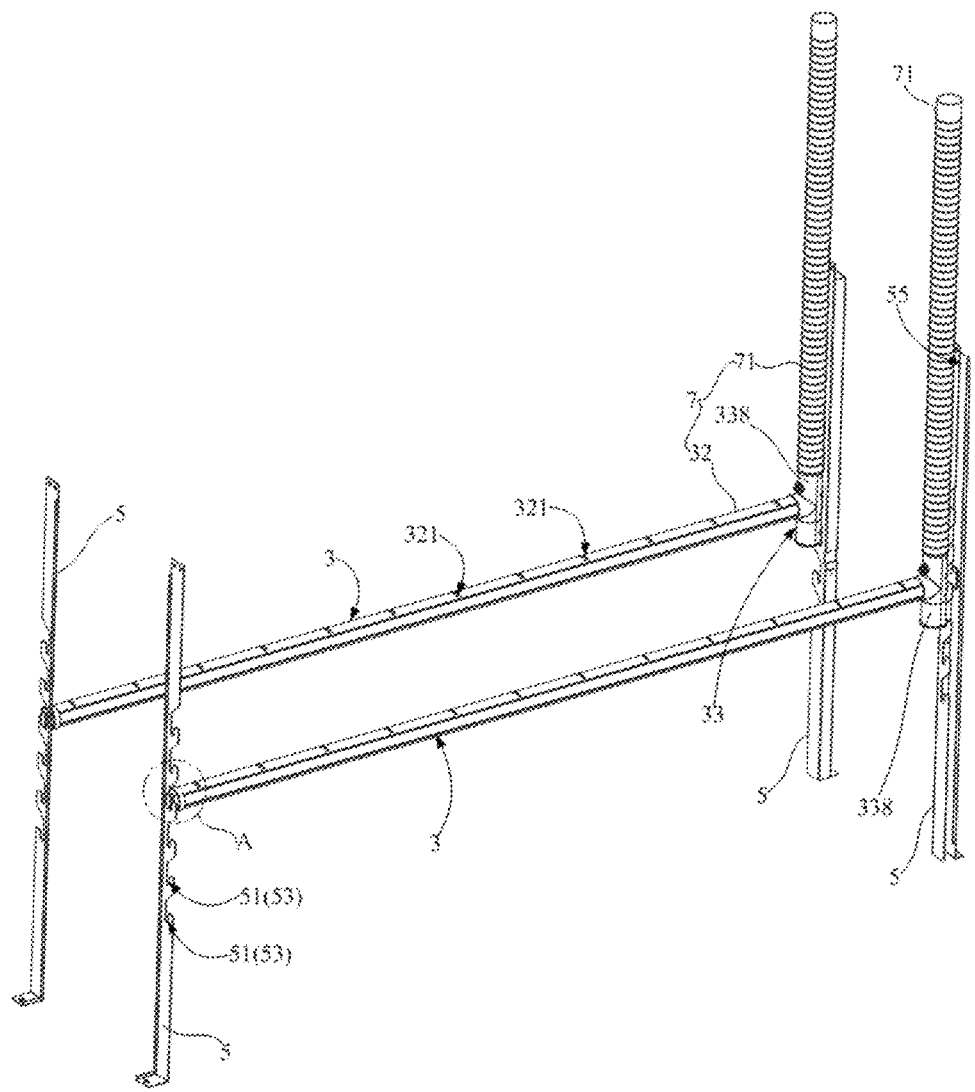
FIG. 6 illustrates a schematic view showing an assembled structure of the auxiliary plant-lighting lamp and the fixing rod of FIG. 2.
Figure 7:
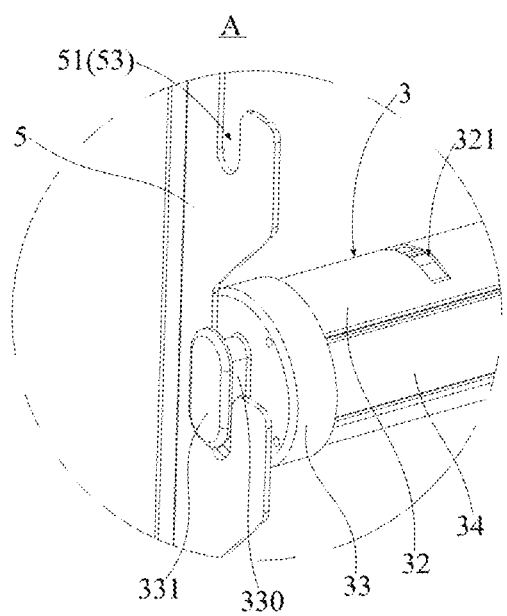
FIG. 7 illustrates a partially enlarged schematic view at A in FIG. 6.
Figure 8:
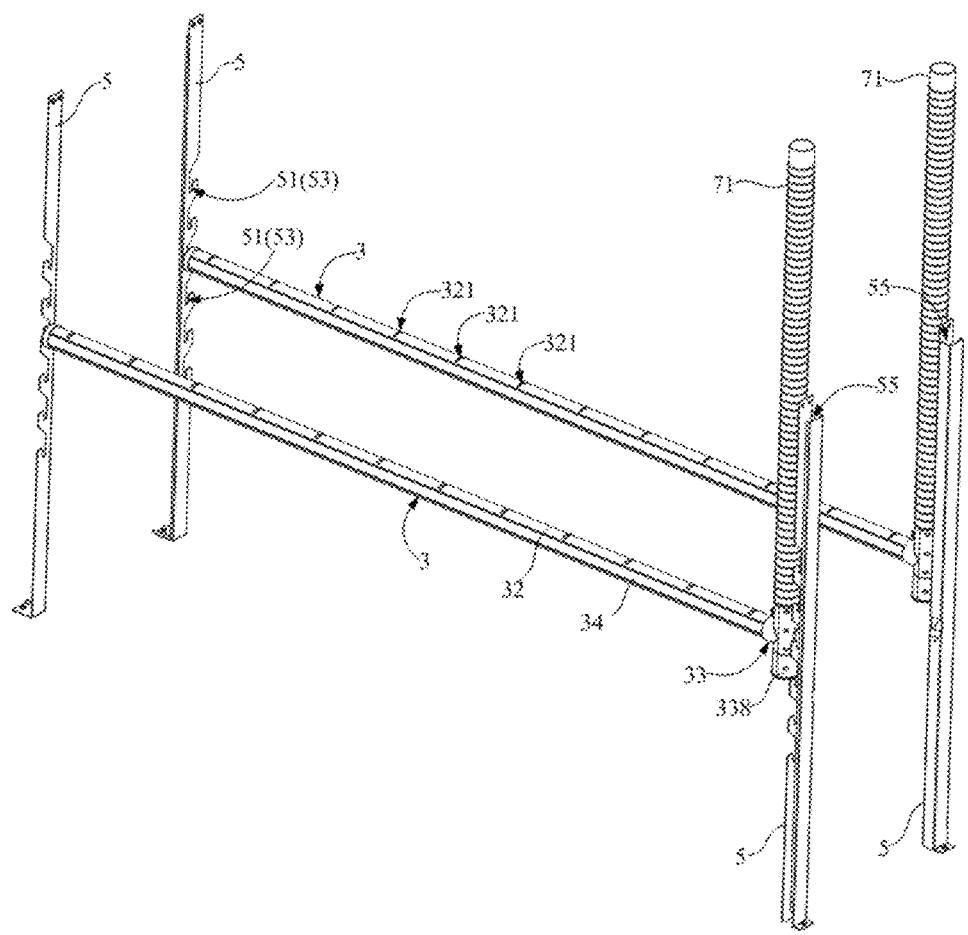
FIG. 8 illustrates another perspective view illustrating an assembled structure of the auxiliary plant-lighting lamp and the fixing rod of FIG. 2.
Figure 13:
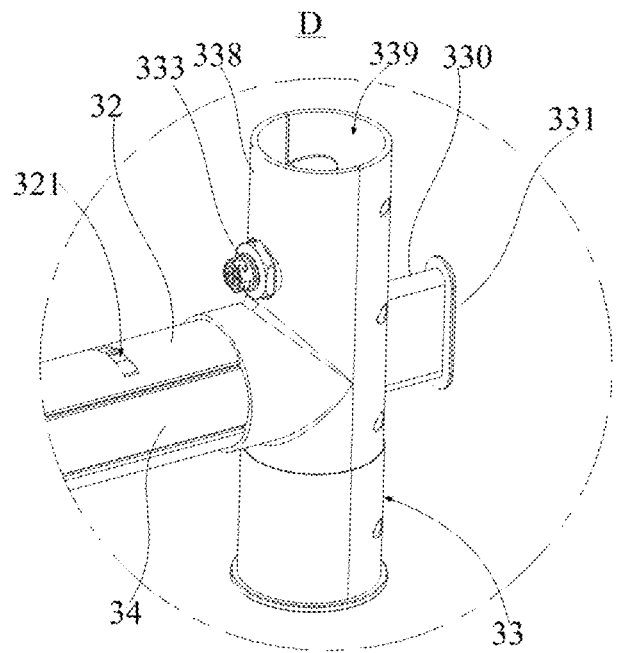
FIG. 13 illustrates a partially enlarged schematic view at D in FIG. 11.
Figure 14:
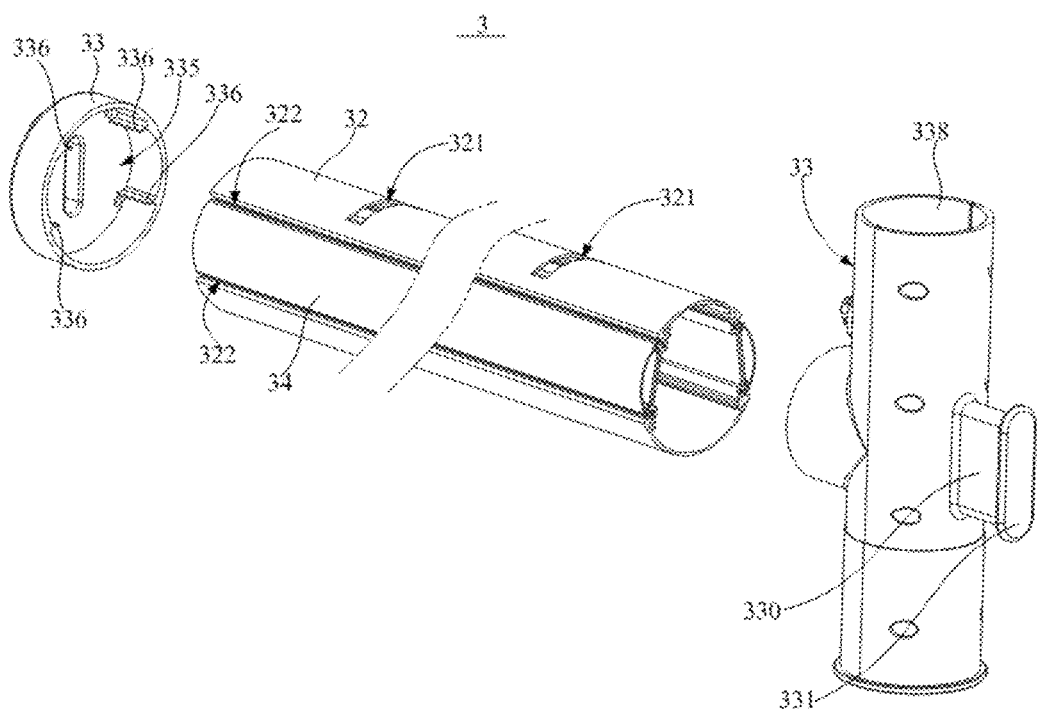
FIG. 14 illustrates a schematic view showing an explosion structure of the auxiliary plant-lighting lamp of FIG. 11.
Figure 15:
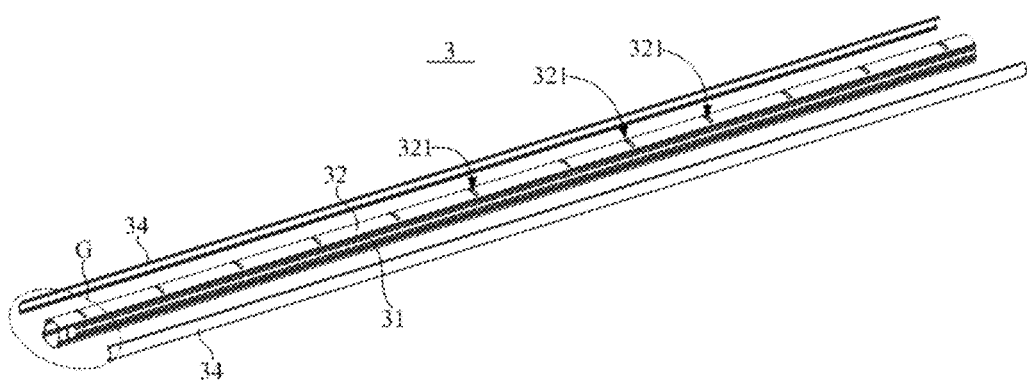
FIG. 15 illustrates a partial exploded view of the auxiliary plant-lighting lamp of FIG. 14.
Figure 16:
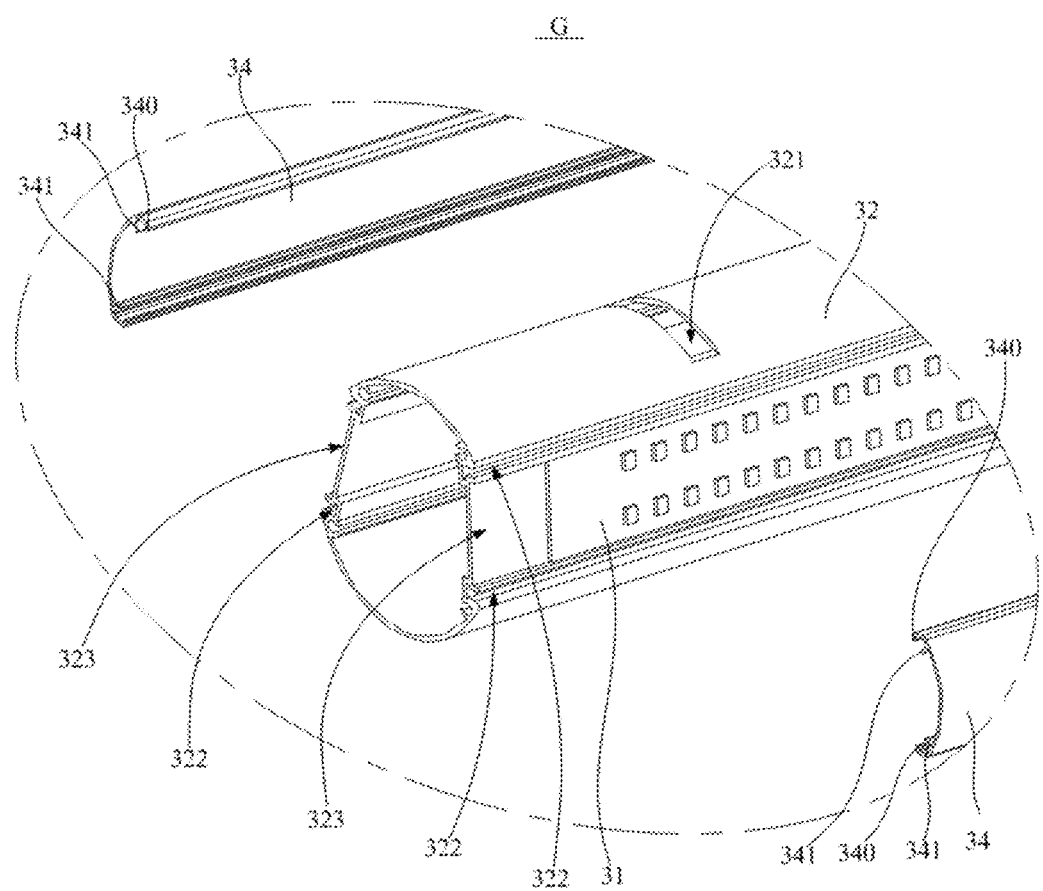
FIG. 16 illustrates an enlarged fragmentary view at G in FIG. 15.
Figure 17:
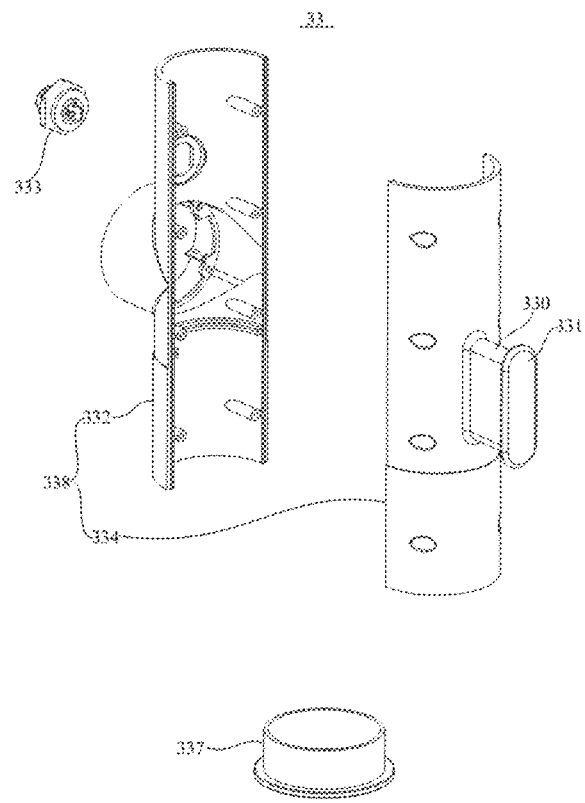
FIG. 17 illustrates a schematic view of an exploded configuration of the end cap of FIG. 14.
Figure 18:
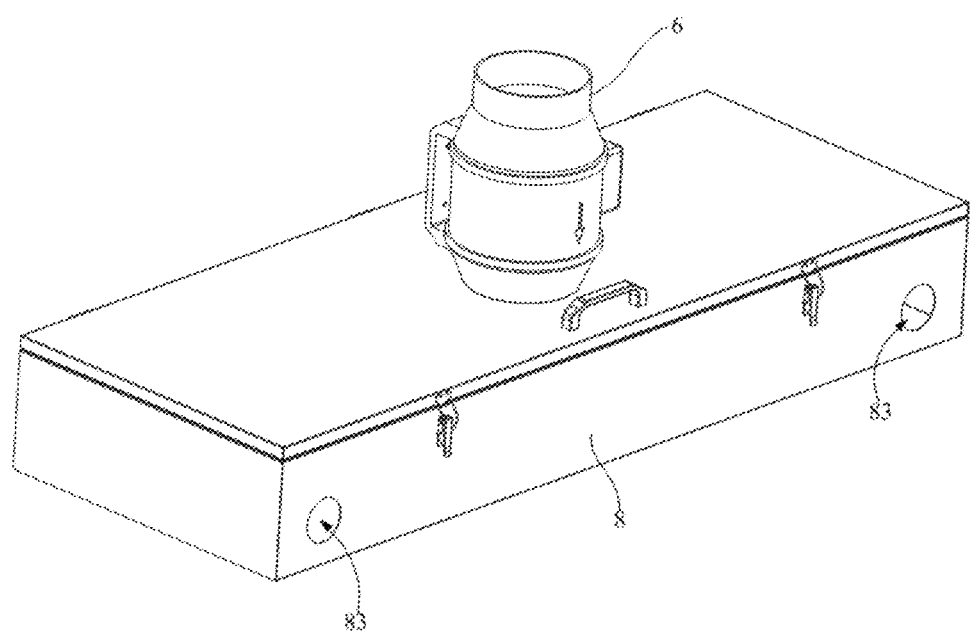
FIG. 18 illustrates a schematic view of the fan assembly and the electrical box of FIG. 2.
Figure 19:
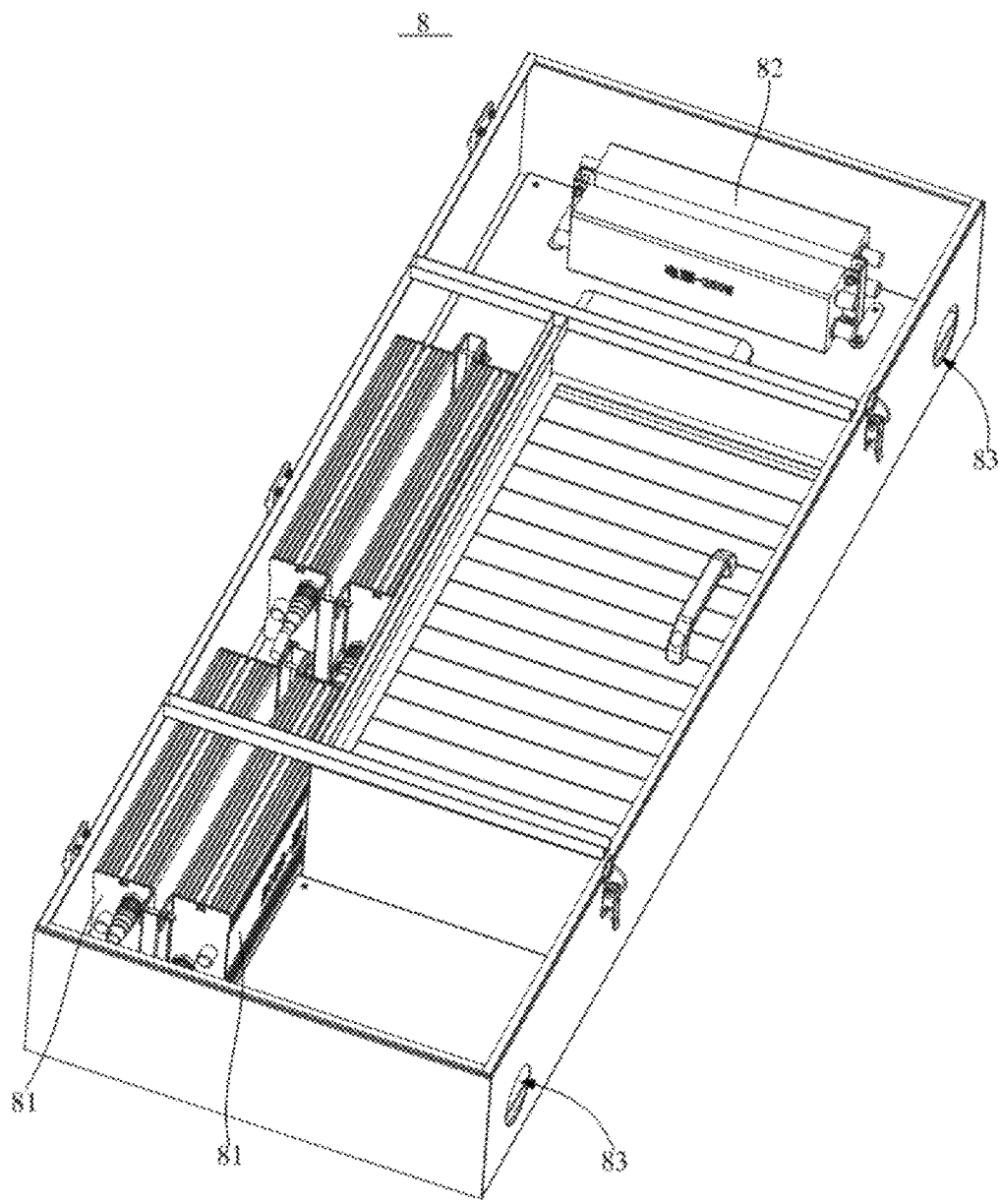
FIG. 19 illustrates a partial schematic view of the appliance box of FIG. 18.
Figure 20:
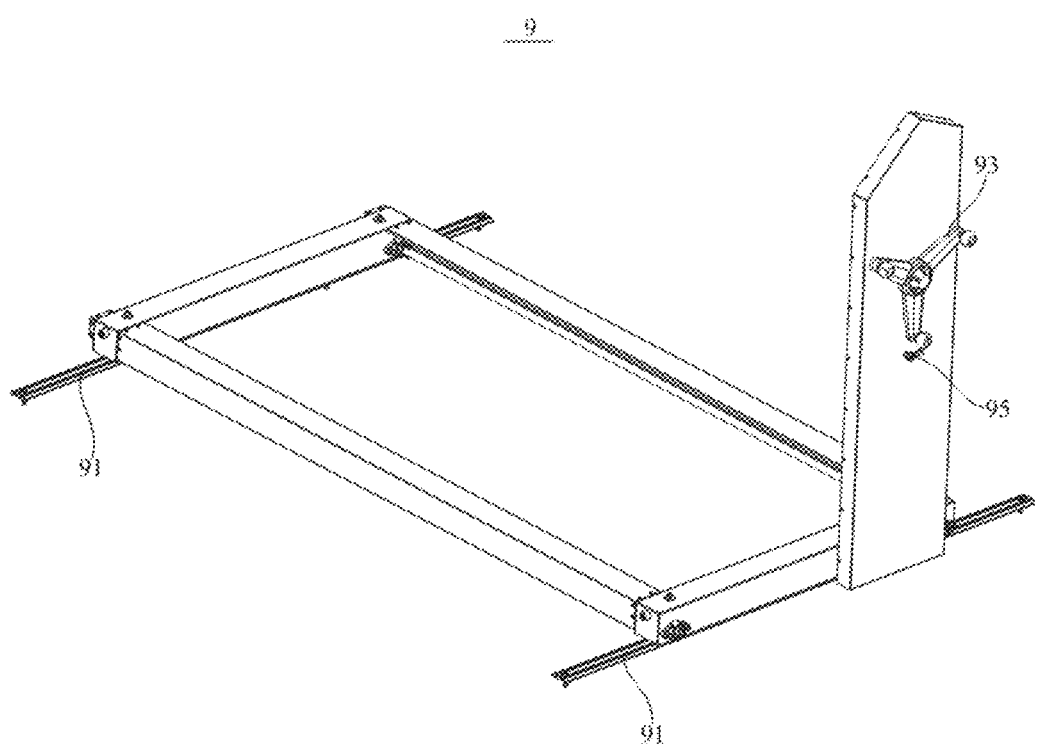
FIG. 20 illustrates a schematic view of the moving mechanism of FIG. 2.
Figure 21:
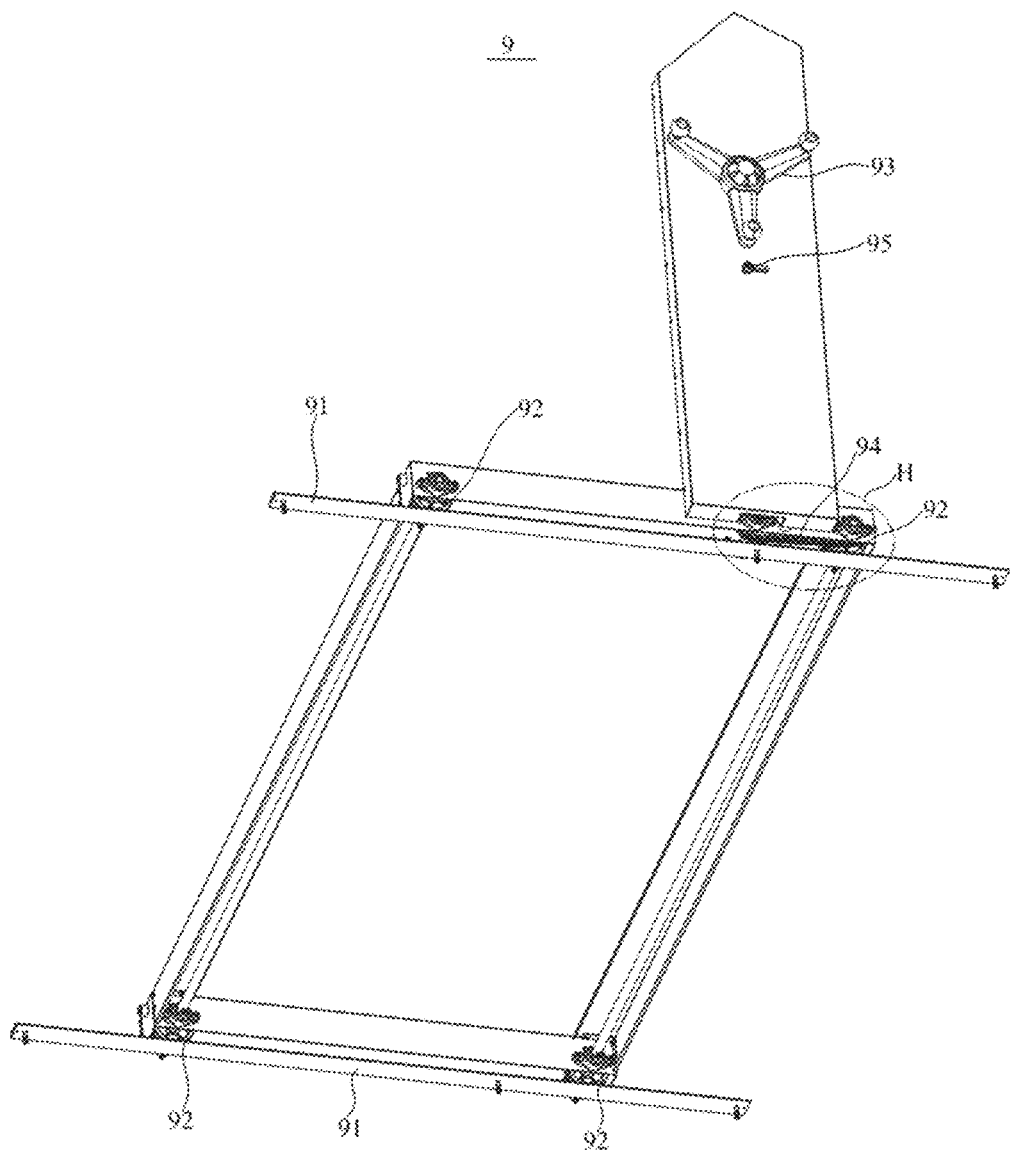
FIG. 21 illustrates a schematic view of another view of the moving mechanism of FIG. 20.
Figure 22:
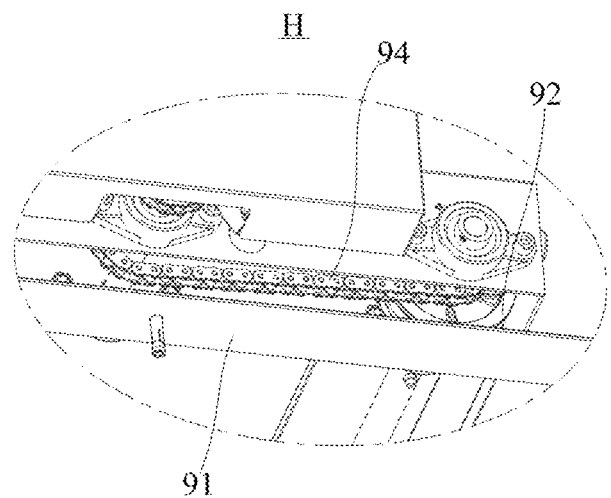
FIG. 22 illustrates an enlarged fragmentary view at H in FIG. 21.

Further, referring to FIG. 6, FIG. 11, and FIG. 13 in combination, the connecting pipe 338 has three vents 339 communicating with each other, one vent 339 communicating with the inner cavity of the heat sink 32, another vent 339 communicating with the air transmission pipe 71, and yet another vent 339 communicating with another air transmission pipe 71 or provided with a sealing cover 337 for covering it. At this time, it is possible to easily communicate and combine the plurality of air transmission pipes 71 and the connecting pipes 338 of the plurality of heat sinks 32 to supply the mixed air of indoor air and the carbon dioxide to the plurality of heat sinks 32. The lower end of the connecting pipe 338 of the lowermost heat sink 32 is provided with a sealing cover 337. Referring to FIGS. 14 and 17 in combination, the end cover 33 provided with the connecting pipe 338 may comprise a first cover body 332 and a second cover body 334 in the front-rear direction, the first cover body 332 and the second cover body 334 both extend in the up-down direction and are detachably connected, the first cover body 332 is in communication with the inner cavity of the heat sink 32, and the second cover body 334 and the first cover body 332 are covered to form the connecting pipe 338, thereby simplifying the processing and installation of the end cover 33. In addition, the first cover body 332 may be provided with at least one connection terminal 333, wherein a portion of the connection terminal 333 located inside the first cover body 332 is used for being electrically connected to the second light-emitting module 31, and a portion located outside the first cover body 332 is used for being electrically connected to the second power supply 82, so as to shorten connection path, thereby improving the convenience of electrically connecting the second light-emitting module 31 and the second power supply 82. Referring to FIGS. 1, 8, 18, and 19 in combination, the plant grow lighting system 100 may include an electrical box 8 with a second power supply 82 disposed within the electrical box 8. At the same time, at least one first power supply 81 is also provided in the electric box 8, and the first power supply 81 is electrically connected to the main plant-lighting lamps 2. At this time, it is more convenient to arrange wiring; one side of the electric box 8 may be provided with a plurality of wiring holes 83 so as to lead out electric wires from the inside of the electric box 8; the fixing rods 5 provided adjacent to the electric box 8 of the plant grow lighting system 100 may be provided with wiring grooves 55 extending in the up-down direction; the electric wires passed through by the wiring holes 83 are laid in the wiring grooves 55, and are electrically connected to the main plant-lighting lamps 2 and the auxiliary plant-lighting lamps 3 after passing through the wiring grooves 55. In addition, the electric box 8 may be provided at the top of the growth rack 1, and the fan assembly 6 may be installed at the top of the electric box 8 to improve the compactness of the overall structure of the plant grow lighting system 100. Further, in order to improve the ease of connection between the end cap 33 and the heat sink 32, referring to FIGS. 14 to 16 in combination, the end cap 33 is provided with a insertion groove 335 near one end of the heat sink 32, and the end of the heat sink 32 is inserted into the insertion groove 335 so as to be pre-fixed by mating and aligning the two. Furthermore, the groove side wall of the insertion groove 335 is convexly provided with a plurality of rotation-stopping plates 336, the heat sink 32 is provided with rotation-stopping grooves 322, the rotation-stopping grooves 322 extends through the front and rear end faces of the heat sink 32, and the rotation-stopping plates 336 are inserted into the rotation-stopping grooves 322, so that the end cover 33 and the heat sink 32 do not rotate relative to each other after being inserted, thereby improving the structural strength of the parts. In addition, the rotation-stopping grooves 322 are provided on the left side and/or the right side of the heat sink 32, and the plant light supplement lamp (the auxiliary plant-lighting lamp) may further comprise at least one lamp-shade 34, wherein the lamp-shade 34 is provided with at least one clamping plate 340, and the clamping plate 340 is clamped in the rotation-stopping grooves 322 and covers the second light-emitting modules 31, so as to achieve the protection of the second light-emitting module 31. At this time, the rotation-stopping plate 336 abuts the outer side of the clamping plate 340. Furthermore, the inner side of each lamp-shade 34 is provided with at least one abutting plate 341, and the abutting plate 341 abuts against the second light-emitting module 31; the heat sink 32 is provided with mounting grooves 323 at the position corresponding to the second light-emitting modules 31, and the second light-emitting module 31 is mounted in the mounting groove 323, so that the mounting of the second light-emitting module 31 can be made faster and more stable by limiting the mounting groove 323 and abutting the abutting plate 341.

Figure 23:
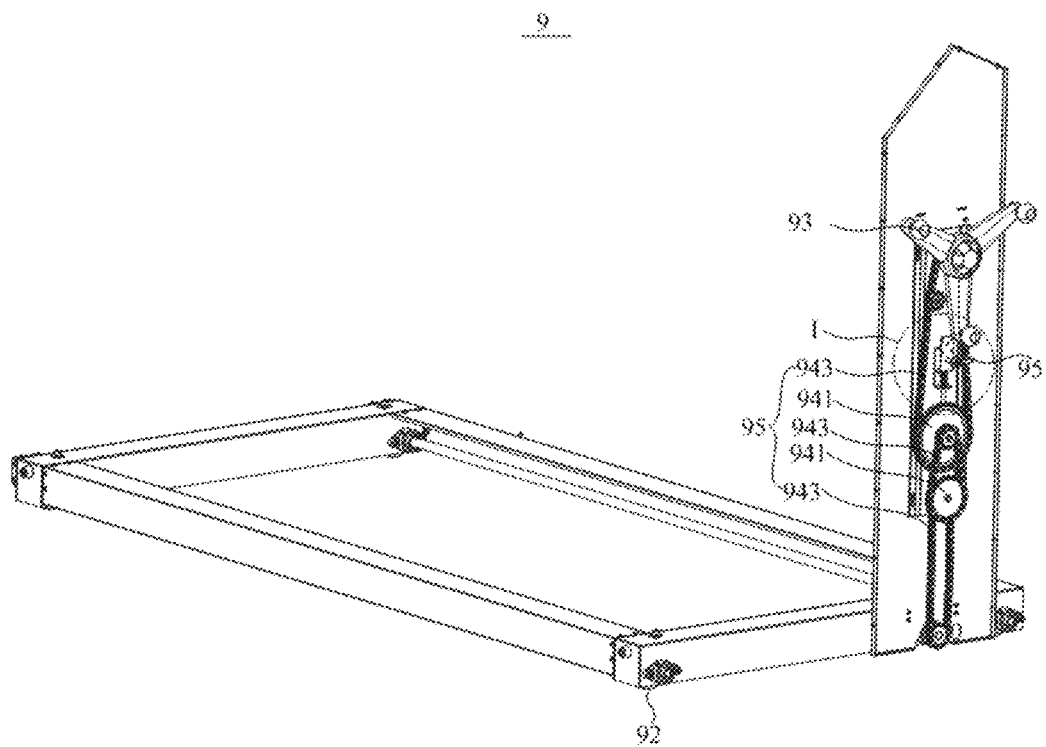
FIG. 23 illustrates a partial schematic view of the moving mechanism of FIG. 20.
Figure 24:
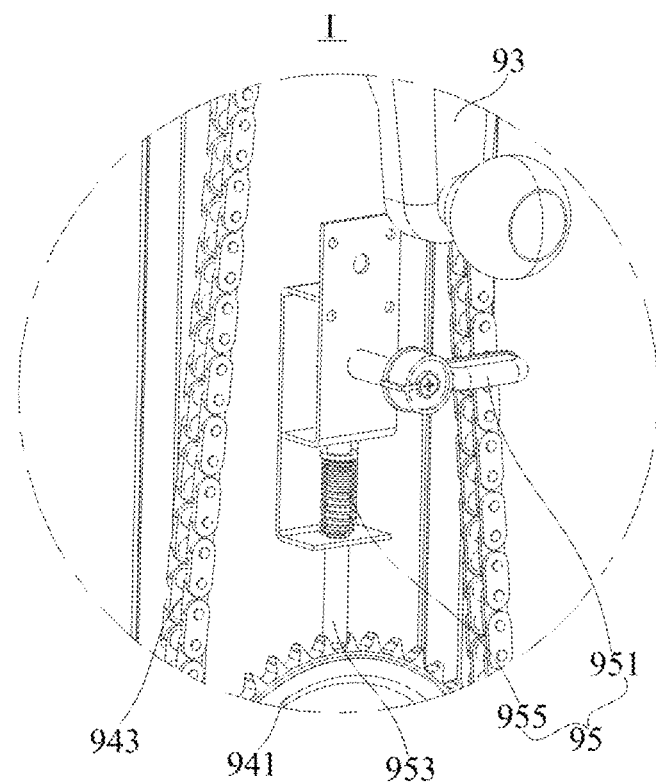
FIG. 24 illustrates a partially enlarged schematic view at I in FIG. 23.
Figure 25:
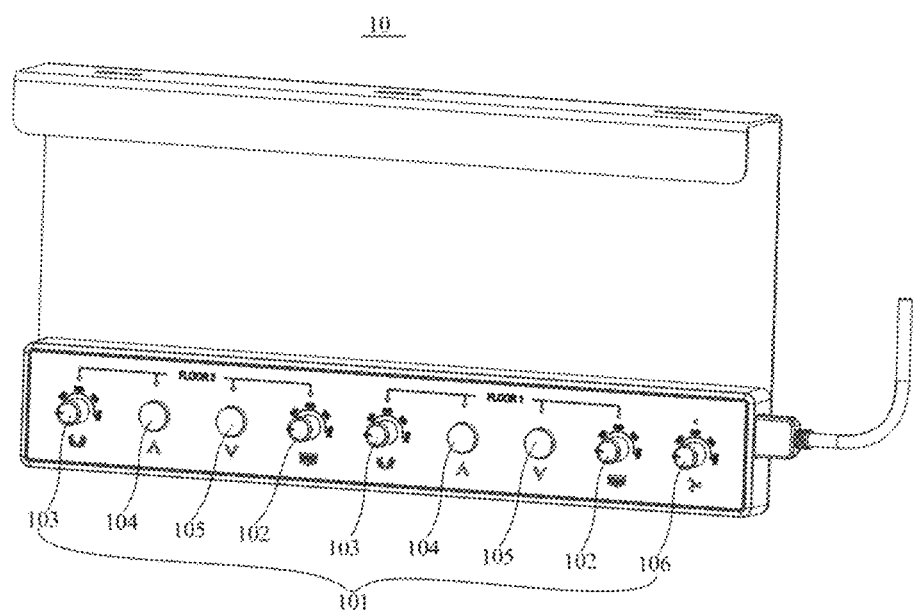
FIG. 25 illustrates a schematic view of the control assembly of FIG. 2.

In an embodiment of the present disclosure, referring to FIGS. 1, 20, 21 and 22 in combination, the plant grow lighting system 100 may further comprise a moving mechanism 9, wherein the moving mechanism 9 is provided at the bottom of the growth rack 1, and the moving mechanism 9 comprises at least one guide rail 91 and at least one guide wheel 92, wherein the guide rail 91 used for fixing to the ground, and the guide rail 91 extend in the left-right direction, and the at least one guide wheel 92 movably provided on the guide rail 91 along the extending direction of the guide rail 91. At this time, the plant grow lighting system 100 can move only in the left-right direction, so that it can move smoothly, and the plants on the overhead layer are not dropped. The moving mechanism 9 further comprises a turntable 93, a transmission mechanism 94 and a locking device 95, wherein the rotation of the turntable 93 can drive the rotation of the guide wheel 92 via the transmission mechanism 94, and the locking device 95 can conduct or block the transmission between the turntable 93 and the guide wheels 92. The guide wheel 92 can thus be locked and unlocked by the locking device 95, facilitating its pushing only when it is necessary to move the plant grow lighting system 100. Furthermore, with reference to FIGS. 23 and 24, the transmission mechanism 94 comprises a plurality of gears 941 and a plurality of chains 943 sheathed on the gears 941, and the locking device 95 comprises a handle 951, a locking rod 953 and an elastic member 955, wherein when the handle 951 rotates through an angle, the locking rod 953 can be driven to slide between two adjacent gear teeth abutting on the gear 941 so as to limit and fix the gears 941; when the handle 951 is rotated to another angle, the first resilient member 955 causes the locking rod 953 to slide back out of engagement with the gear 941. Thus, by simply rotating the handle 951, locking and unlocking of the idler 92 can be quickly achieved. Further, referring to FIGS. 1, 2, and 25 in combination, the plant grow lighting system 100 may also include a control assembly 10 that may be used to control the brightness of the main plant-lighting lamps 2 and the auxiliary plant-lighting lamps 3. Further, it can also be used to control the wind speed of the fan assembly 6 and to control the lift&fall mechanisms 4 to drive the main plant-lighting lamps 2 in the up-down direction. Among other things, the control assembly 10 may be disposed to the left of a longitudinal column 14 for ease of manipulation by a user through the control assembly 10. A plurality of control keys 101 can also be provided on the control assembly 10, and for example, the control keys 101 can comprise main lamp adjustment keys 102 (adjusting the brightness of the main plant-lighting lamps 2), secondary lamp adjustment keys 103 (adjusting the brightness of the auxiliary plant-lighting lamps 3), lifting adjustment keys 104 (adjusting the lifting of the main plant-lighting lamps 2), falling adjustment keys 105 (adjusting the falling of the main plant-lighting lamp 2) and a wind speed adjustment key 106 (adjusting the wind speed of the fan).

The above-mentioned description is merely a preferred embodiment of the present disclosure, and does not limit the scope of the patent of the present disclosure. Any equivalent structural transformation made by using the contents of the description and the drawings of the present disclosure under the inventive concept of the present disclosure, or direct/indirect application in other relevant technical fields, is included in the scope of the patent protection of the present disclosure.

What is claimed is:

1. A plant grow lighting system, comprising:
   a growth rack comprising one or more rack layers;
   at least one main plant-lighting lamp, wherein the at least one main plant-lighting lamp is provided on the growth rack, and the at least one main plant-lighting lamp comprises at least one first light-emitting module which emits light downwards;
   at least one auxiliary plant-lighting lamp, wherein the at least one auxiliary plant-lighting lamp is provided on the growth rack, the at least one auxiliary plant-lighting lamp comprises at least one second light-emitting module which emits light in a horizontal direction, and power output in watts at least one auxiliary plant-lighting lamp is less than power in watts of the at least one main plant-lighting lamp; and
   at least one lift and fall mechanism, wherein the lift and fall mechanism is fixed to the growth rack, the at least one main plant-lighting lamp is mounted on the lift and fall mechanism, and the lift and fall mechanism is used for driving the at least one main plant-lighting lamp to move in a vertical direction.

2. The plant grow lighting system of claim 1, wherein:
   the at least one main plant-lighting lamp and the at least one auxiliary plant-lighting lamp are provided on each of the one or more rack layers, and on each layer, an installation height of the at least one auxiliary plant-lighting lamp is lower than an installation height of the at least one main plant-lighting lamp; and/or
   each of the at least one auxiliary plant-lighting lamp comprises two of the second light-emitting modules, wherein the two of the second light-emitting modules are respectively located at opposite sides of the at least one auxiliary plant-lighting lamp, and light-emitting directions of the two of the second light-emitting modules are arranged opposite to each other; and/or
   the plant grow lighting system further comprises at least one fixing rod, wherein the at least one fixing rod is provided on the growth rack and extends in the vertical direction, the at least one fixing rod is further provided with a plurality of first mounting positions in the vertical direction, and the at least one auxiliary plant-lighting lamp is configured to be mounted on any one of the first mounting positions; and/or the fixing rod is detachably connected to the growth rack, the growth rack is provided with a plurality of second mounting positions extending in the width direction, and the fixing rod is configured to be mounted at different positions of the second mounting position in the width direction; and/or
   the growth rack comprises four vertical columns, a plurality of transverse columns and a plurality of longitudinal columns, the vertical columns extend in the vertical direction, the transverse columns extend in the width direction, and the longitudinal columns extend in the length direction, and a plurality of the transverse columns and a plurality of the longitudinal columns located at the same height constitute each of the one or more rack layers; and/or
   the plant grow lighting system further comprises at least one tray, wherein each of the one or more rack layers is provided with a plurality of position-limit plates extending upwards on width ends, and the position-limit plates are configured to abut against, and be connected, to side wall surface of the tray so that the tray limits mounting on the one or more rack layers.

3. The plant grow lighting system according to claim 2, wherein:
   each lift and fall mechanism comprises an electric motor and a screw rod which, when driven to rotate by the electric motor, drives the at least one main plant-lighting lamp to lift and fall; and/or
   each end of the at least one main plant-lighting lamp is provided with one lift and fall mechanism.

4. The plant grow lighting system of claim 2, comprising the at least one fixing rod, wherein:
   a plurality of clamping grooves are provided on each of the at least one fixing rod, the clamping grooves are formed as the first mounting positions, a clamping column is provided at end portions of the at least one auxiliary plant-lighting lamp, and the clamping columns are mountable in notches of the clamping grooves so that the at least one auxiliary plant-lighting lamp is mounted in the first mounting position with a limit; and/or the grow rack further comprises the plurality of transverse columns, the transverse columns are provided with a plurality of elongated holes along the width direction thereof which serve as as the second mounting positions, threaded studs pass through the elongated holes, and nuts are sheathed on the threaded studs passing through the elongated holes so that the at least one fixing rod is detachably mountable in the second mounting positions.

5. The plant grow lighting system of claim 1, wherein:

the plant grow lighting system further comprises a moving mechanism provided at the bottom of the growth rack, the moving mechanism comprising at least one guide rail and at least one wheel, the guide rail is fixed to the ground, the guide rail extends in the left-right direction, and the guide wheel is movably provided on the guide rail in the extending direction of the guide rail;

the plant grow lighting system further comprises a carbon dioxide device for generating carbon dioxide, a fan assembly for mixing indoor air and carbon dioxide, and an air pipe assembly for delivering the mixed indoor air and carbon dioxide to the plant through the air pipe assembly; and/or the plant grow lighting system further comprises an electric box, the electric box is provided with at least one first power supply and at least one second power supply, the first power supply is electrically connected to the at least one main plant-lighting lamp, and the second power supply is electrically connected to the at least one auxiliary plant-lighting lamp; and/or the growth rack has a square structure; and/or the plant grow lighting system further comprises a control assembly provided with control keys, wherein the control assembly is operable to control a brightness of the at least one main plant-lighting lamp and the at least one auxiliary plant-lighting lamp.

6. The plant grow lighting system of claim 5, wherein the plant grow lighting system comprises the moving mechanism, the moving mechanism further comprises a turntable, a transmission mechanism, and a locking device;

rotation of the turntable drives rotation of the at least one guide wheel via the transmission mechanism; and the locking device is configured to permit or block transmission between the turntable and the at least one guide wheel.

7. The plant grow lighting system of claim 6, wherein:

the transmission mechanism comprises a plurality of gears and a plurality of chains sheathed on the gears; and the locking device comprises a handle, a locking rod and an elastic member; and the locking rod is configured such that, in response to the handle rotating through an angle, the locking rod is driven to slide to abut between two adjacent gear teeth of one of the plurality of gears to limit and fix said gear; and, in response to the handle rotating to another angle, the elastic member causes the locking rod to slide out of engagement with said gear.

8. The plant grow lighting system of claim 5, comprising the fan assembly, the air pipe assembly and the carbon dioxide device, wherein:

one end of the air pipe assembly remote from the fan assembly is in communication with an inner cavity of the at least one auxiliary plant-lighting lamp, and the at least one auxiliary plant-lighting lamp is further provided with a plurality of air outlets which are in fluidic communication with the inner cavity.

9. The plant grow lighting system of claim 5, comprising the electric box, wherein:

one side of the electric box is provided with a plurality of wiring holes so as to lead out electric wires from the electric box, the plant grow lighting system further comprises at least one fixing rod which is fixed to the growth rack and is arranged to extend in a vertical direction, the at least one auxiliary plant-lighting lamp is mounted on the fixing rod, and wiring grooves arranged to extend in the vertical direction are provided on the fixing rod adjacent to the electric box so that the electric wires exiting from the wiring holes are laid in the wiring groove and are electrically connected to the at least one main plant-lighting lamp and the at least one auxiliary plant-lighting lamp after passing through the wiring groove.

10. The plant grow lighting system of claim 5, comprising the control assembly and the fan assembly, wherein:

the control assembly is operable to control a speed of the fan assembly.

11. The plant grow lighting system of claim 1, wherein:

the at least one main plant-lighting lamp and the at least one auxiliary plant-lighting lamp, in operation, emit visible light having a wavelength of 380 nm to 780 nm, wherein the visible light comprises red light having a wavelength of 600 to 700 nm, and wherein a proportion of radiant energy of the red light to radiant energy of the visible light is greater than 40%; and/or photosynthetic photon flux density at a top of a plant grown in the plant grow lighting system is in a range of 800-1200 umol/s when the at least one main plant-lighting lamp and the at least one auxiliary plant-lighting lamp are operated; and/or the plant grow lighting system further comprises an air pipe assembly through which air containing carbon dioxide in a concentration in a range of 1200-1400 mg/L is discharged; and/or a power ratio output of the at least one main plant-lighting lamp and the at least one auxiliary plant-lighting lamp ranges from 2:1 to 12:1.

12. The plant grow lighting system of claim 11, in which both the at least one main plant-lighting lamp and the at least one auxiliary plant-lighting lamp are operated to emit the visible light having the red light, wherein:

the proportion of radiant energy of the red light emitted by the at least one auxiliary plant-lighting lamp is greater than the proportion of radiant energy of the red light emitted by the at least one main plant-lighting lamp.

13. The plant grow lighting system of claim 11, comprising the air pipe assembly, wherein:

the air pipe assembly comprising strainers, wherein the air is filtered through said strainers having a MERV level of at least 8 before being discharged from the air pipe assembly, and/or the air pipe assembly comprising an ultraviolet light module, wherein the air is sterilized by said ultraviolet light module before being discharged from the air pipe assembly.

14. The plant grow lighting system of claim 1, further comprising a plurality of growth racks of unitary construction, each of the growth racks having the at least one main plant-lighting lamps and the at least one auxiliary plant-lighting lamps.

\* \* \* \* \*